Patented June 6, 1933

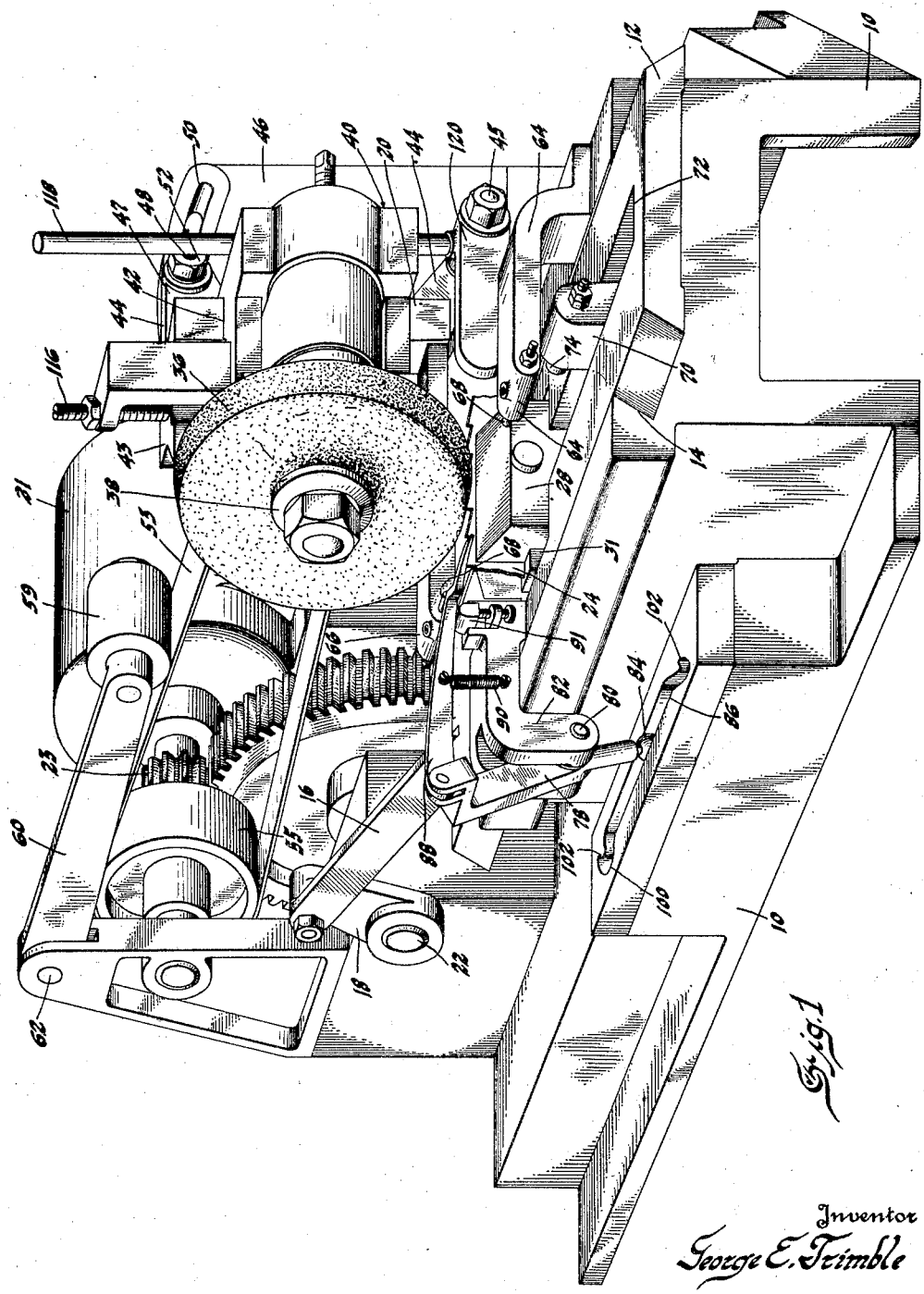

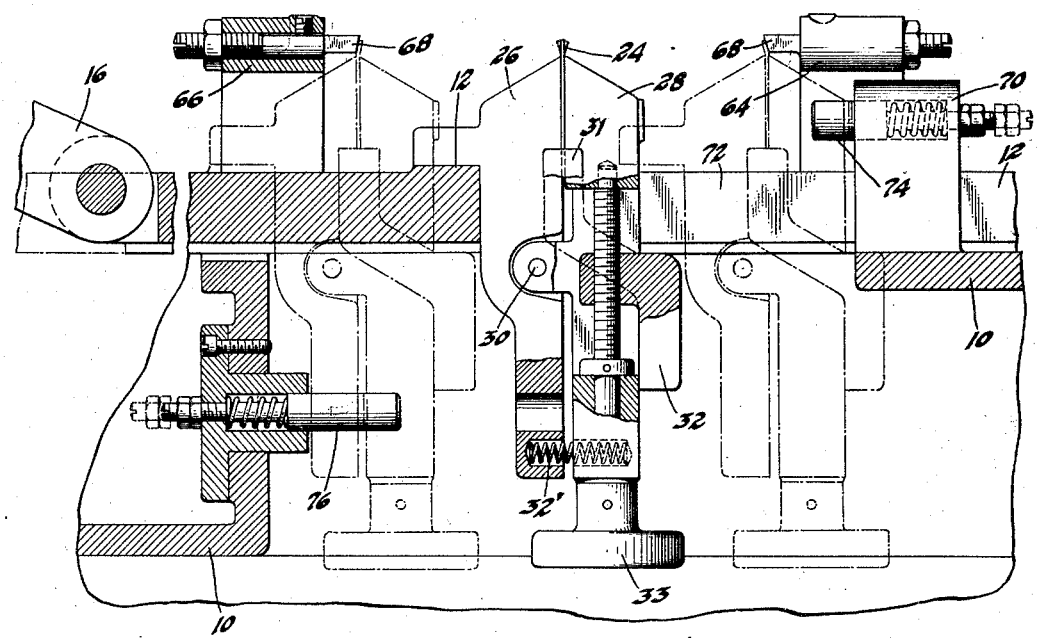

1,913,354

UNITED STATES PATENT OFFICE

GEORGE E. TRIMBLE, OF WALKERVILLE, ONTARIO, CANADA

SAW GRINDING AND SETTING MACHINE

Application filed March 11, 1931. Serial No. 521,698.

This invention has to do with an improved saw sharpening machine which, if desired, may also be equipped with mechanism for automatically setting the teeth of the saw.

In prior saw sharpening machines with which I am familiar, the sharpening wheel, usually of abrasive material, is brought down upon the saw with the result that the impact produces excessive wear of the wheel. The rate of approach of the wheel to the teeth must also be limited to prevent breakage of the wheel and this limits the grinding speed. My improved machine is characterized by the fact that the wheel and saw teeth come into contact very gradually, preferably by causing the engagement to take place along a line tangent to the periphery of the wheel, thereby avoiding injury to the wheel, producing a truer cut, and making it possible to greatly increase the speed of operation.

My improved machine is also characterized by automatic operation. Mechanism is provided to move the saw back and forth across the wheel, or vice versa, and between cuts provision is made to advance the saw tooth by tooth so that the whole of the saw is sharpened without attention by the operator. The described method of operation makes it a simple matter to add the feature of setting the teeth and this is accomplished by providing setters at the ends of the path of movement to engage the teeth and bend them to the right angle after sharpening.

My design involves certain detail relations of parts—for example, the saw tooth indexing or advancing mechanism should be withdrawn from engagement with the teeth during the actual sharpening operation, and I have found it preferable to yieldingly grip the saw during sharpening thus making it necessary, however, to provide means for positively gripping the saw during the setting movement. These details have likewise been worked out in my design.

Other obvious modifications will be pointed out in the course of the following description:

In the drawings, Figure 1 is a perspective view of my complete machine.

Figure 2 is a section through the center of the slide carrying the saw blade, showing the parts in three different positions.

Figure 3 is a vertical section taken longitudinally of the spindle of the sharpening wheel.

Figure 4 shows the adjustable stop limiting the insertion of the saw blade into the holder.

10 indicates the base of the machine. Slide 12 is slidably mounted in guide 14 in the base. One end of the slide 12 is connected by a link 16 to the arm 18 fixed on spindle 22, journaled in the base. The spindle 22 and its arm 18 are driven by an electric motor 21 mounted on the base, through the medium of suitable gearing 23. The slide 12 carries a holder for the saw blades, one of which is indicated at 24. The holder comprises a jaw 26 fixed on the slide, and a jaw 28 pivoted at 30 to the jaw 26. One or more coil springs 32' tends to bring the jaws together to engage the blade. The blade 24 rests upon supporting fingers 31 projecting upwardly from slide 32 which may be vertically adjusted to accommodate blades of different widths by manipulating a handle 33.

A grinding wheel 36 is mounted above the slide in position to grind the saw teeth. The grinding wheel is fixed on an arbor 38 carried in a sleeve 39 journalled in a journal box 40 provided with guideway 42 slidably engaging guide 43 having an integral arm 44 pivoted on the bolt 45 mounted in a vertical web 46, extending upwardly from the base 10. The guide 43 is likewise provided with an integral arm 47 apertured to receive a locking bolt 48 riding in the arcuate guide 50 formed in the upper end of the web 46. By tightening up a nut 52 the guide 43 may be locked in any desired position of tilt in a vertical plane. This is desirable to position the wheel for grinding wood saws having teeth at different angles. The guide 43 is apertured at 51 to permit passage of belt 53 passing over pulley 55 mounted on the motor shaft and over pulley 57 mounted on sleeve 39. The belt is tensioned by means of roller 59 carried by the arm 60 pivoted at 62 to the bracket on which the motor is mounted.

The grinding wheel 36 may be adjusted axially in the sleeve 39 by manipulating screw 110 having a spherical end 112 held in a socket in the end of spindle 38 by means of pins 114.

The journal box 40 may be adjusted vertically by manipulating screw 116, the lower end of which bears against the top of the guide 43. The weight of the grinding wheel assembly holds it in its lowermost position. To quickly raise the wheel from the work, lever 118 is provided, pivoted on the bolt 45, and having an integral arm 120 engaging beneath the arm 20 on journal box 40.

Brackets 64 and 66 are mounted on the base 10 at equal distances from the center line of the grinding wheel 36 and substantially in the plane of the wheel. Each bracket carries at its upper end an adjustable saw tooth setter 68. Below the bracket 64 a lug 70 projects upwardly through slot 72 on the slide 12. The lug 70 carries a spring pressed plunger 74. A similar plunger 76 is mounted below the bracket 66.

The slide 12 is provided with a more or less conventional mechanism for advancing the saw blade the distance of one tooth for each reciprocation of the slide. This arrangement consists of a lever 78, pivoted at 80 to an arm 82 carried by the slide 12. The lower end of the lever 78 carries a spherical antifriction roller 84 traveling in a cam slot 86 formed in the base 10. To the upper end of the lever 78 is pivoted the dog 88, held against the teeth of the saw by a spring 90. An adjustable stop 91 carried by the slide determines the length of the feed stroke, and by adjusting it the machine may be adapted for saws having different length teeth.

In operation the grinding wheel 36 is driven continuously by the motor 21 through the belt 53. The slide 12 is reciprocated by rotation of the arm 18 which is connected to the slide by the link 16. The grinding begins as the saw is moved beneath the grinding wheel, and the cut increases to a maximum at mid-position. The subsequent movement of the slide 12 brings the roller 84 into the outwardly bent portion 100 of the cam slot 86 swinging the dog 88 forwardly to advance the saw one tooth. The roller then moves into the forwardly turned portion 102 of the cam slot, withdrawing the dog a slight distance from the tooth, the tooth then engages a setter 68 giving it the proper set. When in the setting position the pivoted jaw 28 is locked against the saw blade either by engagement of the plunger 74 with the upper end of the member 28 or by engagement of the plunger 76 with the lower end of the member 28 depending upon which setter is functioning.

The slide then reverses its movement, the spherical bearing 84 traveling first outwardly, and then inwardly, thereby withdrawing the dog 88 for the next feeding movement. The new tooth now in position for sharpening is brought beneath the grinding wheel and ground, then carried to the opposite setter 68 and set, and a new tooth is fed forwardly as has already been described. The slide 12 travels at about 80 cycles per minute, and on each cycle grinds and sets two teeth.

I have referred in the above description to a grinding wheel, but it is obvious that there may be substituted for it a wheel for filing the teeth of the saw.

It is obvious that if preferred the saw may be held stationary while the grinding wheel and saw tooth setters traverse it. I prefer the method illustrated.

I claim:

1. In a saw sharpening machine, the combination of a rotary sharpening wheel, means for rotating the wheel, a saw holder and means for relatively moving the holder and the wheel to cause the saw and wheel to gradually engage along a path tangential to the wheel to produce the desired cut, a saw tooth setter fixedly positioned with respect to the wheel and in the said path of movement and adapted to engage the saw teeth and set them by means of the pressure produced by said second named means.

2. In a saw sharpening machine, the combination of a rotary sharpening wheel, means for rotating the wheel, a saw holder, and means for relatively moving the holder and the wheel to cause the saw and wheel to gradually engage along a path tangential to the wheel to produce the desired cut, a saw tooth setter fixedly positioned with respect to the wheel and in the said path of movement so as to engage the saw teeth and set them by means of the pressure produced by said second named means, means operative when the saw is out of contact with the wheel and setter for relatively moving the saw and the wheel to present the next tooth for the cutting operation.

3. In a saw sharpening machine, the combination of a rotary sharpening wheel, means for rotating the wheel, a saw holder, and means for relatively reciprocating the wheel and the holder to cause the saw and the wheel to gradually engage and disengage along a path substantially tangential to the wheel to produce the desired cut, saw tooth setters fixedly positioned with respect to the grinding wheel and at oposite ends of the said path of movement so as to engage the saw teeth adjacent the extreme ends of the path of movement and set them by means of the pressure produced by said second named means.

4. In a saw sharpening machine, the combination of a rotary sharpening wheel, means for rotating the wheel, a saw holder, and means for relatively reciprocating the wheel and the holder to cause the saw and the wheel to gradually engage and disengage along a path substantially tangential to the wheel to produce the desired cut, saw tooth setters fixedly positioned with respect to the grinding wheel and at opposite ends of the said path of movement so as to engage the saw teeth adjacent the extreme ends of the path of movement and set them by means of the pressure produced by said second named means, means operative when the saw is out of contact with the wheel and setter for relatively moving the saw and the wheel to present the next tooth for the cutting and setting operation.

5. In a saw sharpening machine, the combination of a rotary sharpening wheel, means for rotating the wheel, a saw holder, and means for relatively moving the holder and the wheel to cause the saw and wheel to gradually engage along a path tangential to the wheel to produce the desired cut, a saw tooth setter fixedly positioned with respect to the wheel and in the said path of movement so as to engage the saw teeth and set them by means of the pressure produced by said second named means, said holder comprising parts adapted to yieldably grip the saw, and means adapted to engage said parts to lock them in engagement, said means being operative just prior to engagement of the saw tooth and setter.

6. In a saw sharpening machine, the combination of a rotary sharpening wheel, means for rotating the wheel, a saw holder, and means for relatively reciprocating the wheel and the holder to cause the saw and the wheel to gradually engage and disengage along a path substantially tangential to the wheel to produce the desired cut, saw tooth setters fixedly positioned with respect to the grinding wheel and at opposite ends of the said path of movement so as to engage the saw teeth adjacent the extreme ends of the path of movement and set them by means of the pressure produced by said second named means, said holder comprising parts adapted to yieldably grip the saw, and means adjacent the ends of the path of movement adapted to engage said parts to lock them in engagement, said means being operative just prior to engagement of the saw tooth and setter.

7. In a saw sharpening machine, the combination of a base, a sharpening wheel journalled on the base, means for rotating the wheel, a saw holder slidably mounted on the base, means for causing the holder to perform a movement substantially tangent to the periphery of the wheel, and a saw tooth setter mounted on the base adjacent the end of movement of the holder to effect setting of the teeth by means of the pressure produced by said second named means.

8. In a saw sharpening and setting machine, the combination of a sharpening wheel, means for rotating the wheel, a saw holder, means for moving the holder back and forth adjacent the wheel so as to bring the saw teeth into and out of contact with the wheel, and a saw tooth setter mounted near one end of the path of movement of the holder so as to engage the saw teeth when out of contact with the wheel to set them by means of the pressure produced by said second named means.

9. In a saw sharpening and setting machine, the combination of a sharpening wheel, means for rotating the wheel, a saw holder, means for moving the holder back and forth adjacent the wheel so as to bring the saw teeth into and out of contact with the wheel, and a pair of saw tooth setters mounted adjacent the ends of the path of movement of the holder so as to engage the saw teeth when out of contact with the wheel to set them by means of the pressure produced by said second named means.

10. In a saw sharpening and setting machine, the combination of a sharpening wheel, means for rotating the wheel, a saw holder comprising jaws to yieldingly grip the saw, means for moving the holder back and forth adjacent the wheel so as to bring the saw teeth into and out of contact with the wheel, and a saw tooth setter mounted near one end of the path of movement of the holder so as to engage the saw teeth when out of contact with the wheel to set them by means of the pressure produced by said second named means, and means arranged in advance of said setting device for increasing the gripping action of the jaws prior to setting of the teeth.

11. In a saw sharpening and setting machine, the combination of a sharpening wheel, means for rotating the wheel, a saw holder comprising jaws to yieldingly grip the saw, means for moving the holder back and forth adjacent the wheel so as to bring the saw teeth into and out of contact with the wheel, means operative adjacent one end of the path of movement of said holder for advancing the saw beneath the wheel upon each reciprocation of the holder, means acting after said last named means for increasing the gripping action of said jaws, and a saw tooth setter mounted near one end of the path of movement of the holder so as to engage the saw teeth when out of contact with the wheel to set them by means of the pressure produced by said second named means.

12. In a saw tooth setter, the combination of a support having a saw tooth setting surface, a holder adapted to receive and tightly grip the portion of a saw below the teeth thereof with one side of certain of the teeth of the saw facing the said surface, and means for moving the holder toward the support to cause the said surface to engage and set the teeth of the saw, and means for automatically advancing the saw to present a new tooth, said means acting when the saw is out of contact with said surface.

13. In a saw tooth setter, the combination of a support having a saw tooth setting surface, a holder adapted to yieldingly clamp a saw therein with the sides of certain of its teeth facing the said surface, means for moving the support and holder relatively to each other to cause the setting surface to engage and set the teeth of the saw, and means cooperating with said holder and arranged to come into play prior to said setting action to increase the clamping action.

14. In a saw tooth setter, the combination of a support having a saw tooth setting surface, a holder adapted to yieldingly clamp a saw therein with the sides of certain of its teeth facing the said surface, means for moving the support and holder relatively to each other to cause the setting surface to engage and set the teeth of the saw, and means cooperating with said holder and arranged to come into play prior to said setting action to increase the clamping action, means for automatically advancing the saw to present a new tooth, said means acting when said last named means is inoperative and the saw is out of contact with said surface.

15. In a saw tooth setter, the combination of a plurality of spaced supports each having a saw tooth setting surface, a holder adapted to receive and tightly grip the portion of a saw below the teeth thereof with one side of certain of the teeth of the saw facing the setting surface of one support, and the other side of certain of the teeth of the saw facing the setting surface of the other support, means for moving said holder and saw back and forth between said supports to cause the setting surfaces to alternately engage and set the teeth of the saw.

16. In a saw tooth setter, the combination of a plurality of spaced supports each having a saw tooth setting surface, a holder adapted to receive and tightly grip the portion of a saw below the teeth thereof with one side of certain of the teeth of the saw facing the setting surface of one support, and the other side of certain of the teeth of the saw facing the setting surface of the other support, means for moving said holder and saw back and forth between said supports to cause the setting surfaces to alternately engage and set the teeth of the saw, and means for automatically advancing the saw to present a new tooth, said means acting when the saw is out of contact with said surface.

17. In a saw tooth setter, the combination of a plurality of spaced supports each having a saw tooth setting surface, a holder adapted to receive a saw with one side of certain of its teeth facing the setting surface of one support, and the other side of certain of its teeth facing the setting surface of the other support, means for moving said supports and holder relatively to each other to cause the setting surfaces to alternately engage and set the teeth of the saw, and means cooperating with said holder and arranged to come into play prior to said setting action to increase the clamping action.

18. In a saw tooth setter, the combination of a plurality of spaced supports each having a saw tooth setting surface, a holder adapted to receive a saw with one side of certain of its teeth facing the setting surface of one support, and the other side of certain of its teeth facing the setting surface of the other support, means for moving said supports and holder relatively to each other to cause the setting surfaces to alternately engage and set the teeth of the saw, means cooperating with said holder and arranged to come into play prior to said setting action to increase the clamping action, and means for automatically advancing the saw to present a new tooth, said means acting when said last named means is inoperative and the saw is out of contact with said surfaces.

In testimony whereof I affix my signature.

GEORGE E. TRIMBLE.